United States Patent
Kitchin (10) Patent No.: US 9,274,970 B2
(45) Date of Patent: Mar. 1, 2016

(54) METHOD AND APPARATUS FOR HANDLING PROCESSOR READ-AFTER-WRITE HAZARDS WITH CACHE MISSES

(71) Applicant: Samsung Electronics Co., Ltd., Suwon-si, Gyeonggi-do (KR)

(72) Inventor: Paul E. Kitchin, Austin, TX (US)

(73) Assignee: SAMSUNG ELECTRONICS CO., LTD. (KR)

( * ) Notice: Subject to any disclaimer, the term of this patent is extended or adjusted under 35 U.S.C. 154(b) by 65 days.

(21) Appl. No.: 14/307,444

(22) Filed: Jun. 17, 2014

(65) Prior Publication Data

US 2015/0186285 A1 Jul. 2, 2015

Related U.S. Application Data (60) Provisional application No. 61/922,803, filed on Dec. 31, 2013.

(51) Int. Cl.
*G06F 12/00* (2006.01)
*G06F 12/08* (2006.01)

(52) U.S. Cl.
CPC ........ *G06F 12/0875* (2013.01); *G06F 12/0831* (2013.01)

(58) Field of Classification Search
None
See application file for complete search history.

(56) References Cited

U.S. PATENT DOCUMENTS

| | | | |
|---|---|---|---|
| 5,781,752 A | 7/1998 | Moshovos et al. | |
| 6,189,068 B1 * | 2/2001 | Witt | G06F 9/3004 711/118 |
| 6,694,424 B1 | 2/2004 | Keller et al. | |
| 8,549,263 B2 | 10/2013 | Krimer et al. | |
| 2003/0033510 A1 * | 2/2003 | Dice | G06F 9/383 712/235 |
| 2013/0318330 A1 | 11/2013 | Alexander et al. | |
| 2013/0326198 A1 | 12/2013 | Meier et al. | |

* cited by examiner

*Primary Examiner* — Brian Peugh
(74) *Attorney, Agent, or Firm* — Renaissance IP Law Group LLP (57) ABSTRACT

According to one general aspect, an apparatus may include an instruction fetch unit, an execution unit, and a cache resynchronization predictor, as described above. The instruction fetch unit may be configured to issue a first memory read operation to a memory address, and a first memory write operation to the memory address, wherein the first memory read operation is stored at an instruction address. The execution unit may be configured to execute the first memory read operation, wherein the execution of the first memory read operation causes a resynchronization exception. The cache resynchronization predictor may be configured to associate the instruction address with a resynchronization exception, and determine if a memory read operation stored at the instruction address comprises a resynchronization predicted store.

20 Claims, 5 Drawing Sheets

METHOD AND APPARATUS FOR HANDLING PROCESSOR READ-AFTER-WRITE HAZARDS WITH CACHE MISSES

CROSS-REFERENCE TO RELATED APPLICATION

This application claims priority under 35 U.S.C. §119 to Provisional Patent Application Ser. No. 61/922,803, entitled "METHOD AND APPARATUS FOR HANDLING PROCESSOR READ-AFTER-WRITE HAZARDS WITH CACHE MISSES" filed on Dec. 31, 2013. The subject matter of this earlier filed application is hereby incorporated by reference.

TECHNICAL FIELD

This description relates to data management, and more specifically to reading and writing data.

BACKGROUND

Processors or computing systems generally make use of pipelined architectures. In computing, a pipeline is often a set of data processing elements (e.g., execution units, functional unit blocks (FUBs), combinatorial logic blocks (CLBs), etc.) connected in series, where the output of one element or pipeline stage is the input of the next pipeline stage. The stages of a pipeline are often executed in parallel or in time-sliced fashion. This generally allows a computer to execute several instructions substantially in parallel or in near-parallel, as a second instruction may be started in the first pipeline stage as soon as the first instruction has exited that first pipeline stage, despite the first instruction not being fully completed or done all the pipeline stages. This pseudo-parallelism greatly increases the speed at which a group of instructions may complete, despite the instructions' dependence upon each other (e.g., the second instruction may rely upon the result of the first instruction, etc.).

Further, many instructions involve the reading (load) or writing (store) of data from a memory. Often the data is stored in a cache system. A computer's cache system is generally a tiered system of increasingly smaller but faster memory components that each store a sub-set of the data stored in the larger but slower next tier. If the desired piece of data is found in the smallest, fastest cache the instruction completes without incident. However, if the data is not in the sub-set stored in the smallest, fastest cache, the data must be retrieved from the next tier in the system (and so on) and this often causes delays and other complications.

Processors commonly rely on performing load (read) and store (write) instructions out of order to achieve higher performance. If the load and stores are to different memory addresses (i.e. for different pieces of data), this may occur without problems and may speed the overall execution of the program executed by the processor.

However, occasionally when a younger load (read) instruction is executed before an older store (write) instruction to the same memory address, the load (read) may return incorrect or out-of-date data. This is generally known as a pipeline hazard or more specifically a Read-After-Write (RAW) hazard. Generally, when this occurs, processors need to repair the bad load data by performing a costly RAW resynchronization exception (RRE). Often in order to repair this, all in-process instructions younger than the store (write) are flushed from the processor's pipeline (i.e. all the work done on any instructions after the store, including the load, is discarded). All of the instructions after the store are then restarted, as the work previously performed on them was incorrect or suspect. This event is frequently costly due to the extra clock cycles it takes to flush or discard instructions, re-fetch or re-start them, and then re-perform them. This is often referred to as the RRE penalty.

SUMMARY

According to one general aspect, an apparatus may include an instruction fetch unit, an execution unit, and a cache resynchronization predictor. The instruction fetch unit may be configured to issue a first memory read operation to a memory address, and a first memory write operation to the memory address, wherein the first memory read operation is stored at an instruction address. The execution unit may be configured to execute the first memory read operation, wherein the execution of the first memory read operation causes a resynchronization exception. The cache resynchronization predictor may be configured to associate the instruction address with a resynchronization exception, and determine if a memory read operation stored at the instruction address comprises a resynchronization predicted store.

According to another general aspect, an apparatus may include an instruction fetch unit, a cache resynchronization predictor, and an execution unit. The instruction fetch unit may be configured to issue a memory read operation to a memory address, and a memory write operation to the memory address, wherein the memory read operation is stored at an instruction address. The cache resynchronization predictor may be configured to determine if the memory read operation comprises a resynchronization predicted store, based at least upon whether a prior memory read operation from the instruction address caused a resynchronization exception. The execution unit may be configured to, if the memory read operation comprises a resynchronization predicted store, execute the memory write operation after the memory read operation.

According to another general aspect, a method may include causing a resynchronization exception by executing a store operation after a load operation, wherein the store operation is associated with an instruction address. The method may include training a resynchronization predictor to associate the instruction address with a resynchronization predicted store. The method may include preventing, based, at least partially upon the resynchronization predictor, a second execution of the store operation from causing a second resynchronization expectation.

The details of one or more implementations are set forth in the accompanying drawings and the description below. Other features will be apparent from the description and drawings, and from the claims.

A system and/or method for data management, and more specifically to reading and writing data, substantially as shown in and/or described in connection with at least one of the figures, as set forth more completely in the claims.

BRIEF DESCRIPTION OF THE DRAWINGS

Like reference symbols in the various drawings indicate like elements.

DETAILED DESCRIPTION

Various example embodiments will be described more fully hereinafter with reference to the accompanying drawings, in which some example embodiments are shown. The present disclosed subject matter may, however, be embodied in many different forms and should not be construed as limited to the example embodiments set forth herein. Rather, these example embodiments are provided so that this disclosure will be thorough and complete, and will fully convey the scope of the present disclosed subject matter to those skilled in the art. In the drawings, the sizes and relative sizes of layers and regions may be exaggerated for clarity.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on", "directly connected to" or "directly coupled to" another element or layer, there are no intervening elements or layers present. Like numerals refer to like elements throughout. As used herein, the term "and/or" includes any and all combinations of one or more of the associated listed items.

It will be understood that, although the terms first, second, third, etc. may be used herein to describe various elements, components, regions, layers and/or sections, these elements, components, regions, layers and/or sections should not be limited by these terms. These terms are only used to distinguish one element, component, region, layer, or section from another region, layer, or section. Thus, a first element, component, region, layer, or section discussed below could be termed a second element, component, region, layer, or section without departing from the teachings of the present disclosed subject matter.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular example embodiments only and is not intended to be limiting of the present disclosed subject matter. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments are described herein with reference to cross-sectional illustrations that are schematic illustrations of idealized example embodiments (and intermediate structures). As such, variations from the shapes of the illustrations as a result, for example, of manufacturing techniques and/or tolerances, are to be expected. Thus, example embodiments should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the present disclosed subject matter.

Unless otherwise defined, all terms (including technical and scientific terms) used herein have the same meaning as commonly understood by one of ordinary skill in the art to which this disclosed subject matter belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, example embodiments will be explained in detail with reference to the accompanying drawings.

Figure 1:
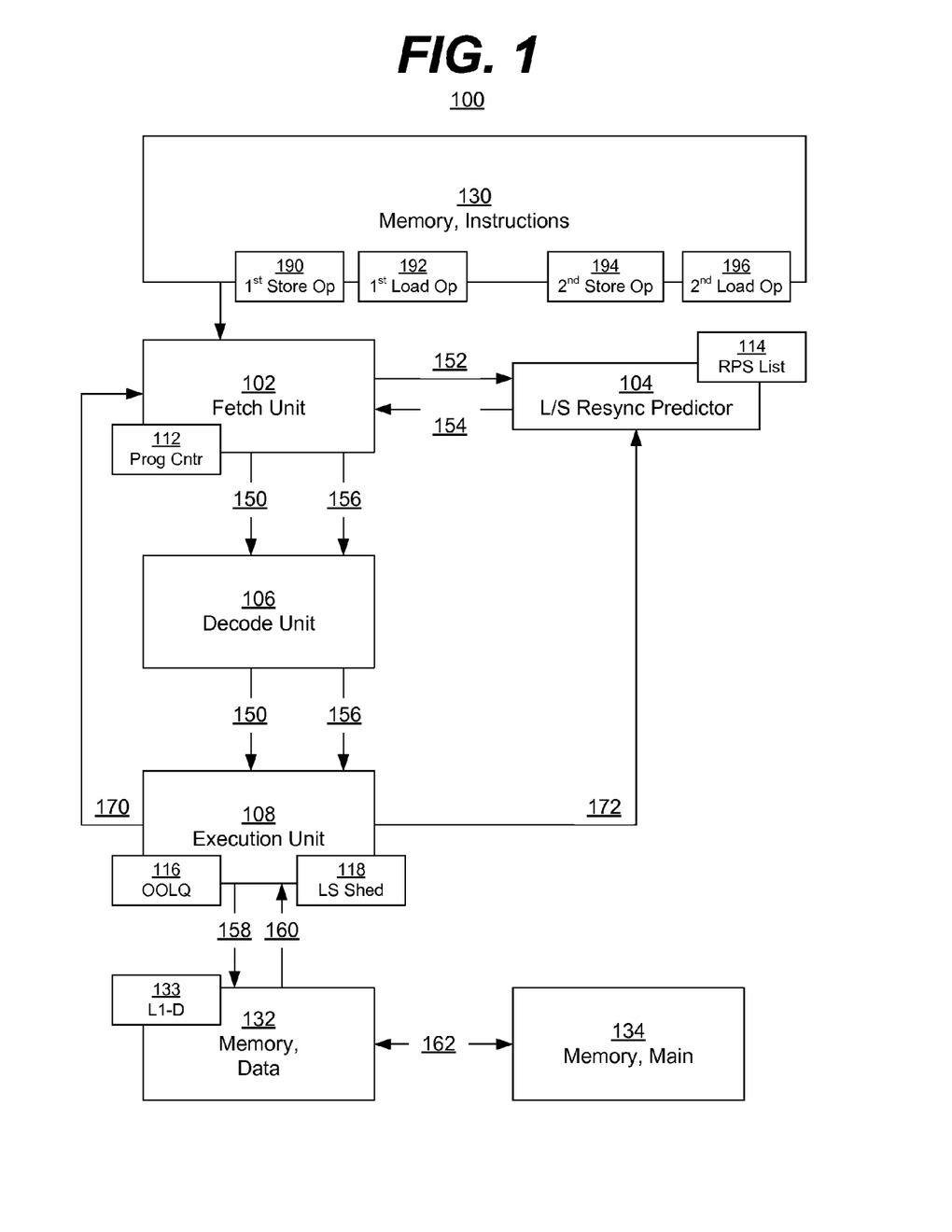
FIG. 1 is a block diagram of an example embodiment of a system in accordance with the disclosed subject matter.

FIG. 1 is a block diagram of an example embodiment of a system 100 in accordance with the disclosed subject matter. In the illustrated embodiment, a system for reducing the occurrence of an RRE is shown. Specifically, an embodiment is illustrated in which four instructions are specifically shown. In the illustrated embodiment, the first pair of instructions may cause an RRE and the system 100 may be employed to avoid a second RRE that would be due to the second pair of instructions. Other scenarios are shown in regards to FIGS. 2 and 3. It is understood that the above are merely a few illustrative examples to which the disclosed subject matter is not limited.

In the illustrated embodiment, the system 100 may include an instruction memory 130 configured to store various instructions or operation codes (e.g., first store operation 190, first load operation 192, second store operation 194, second load operation 196, etc.), wherein each instruction is configured to cause the system 100 to perform an operation. In various embodiments, each of these instructions may be stored at a particular memory address, referred to as an instruction address. In the illustrated embodiment, instructions related to memory operations (e.g., a memory read operation, memory write operation, etc.) are examined, although other types of instructions or operations exist. It is understood that the above are merely a few illustrative examples to which the disclosed subject matter is not limited.

In some embodiments, the system 100 may include a fetch unit 102 configured to retrieve, fetch, or issue instructions from the instruction memory 130. In various embodiments, the fetch unit 102 may be considered the first stage in the pipeline of system 100. In the illustrated embodiment, only three pipeline stages (fetch unit 102, decode unit 106, execution unit 108, etc.) may be explicitly shown but it is understood that these are merely illustrative examples and the disclosed subject matter is not limited to any number of pipeline stages. For example, the classic RISC (Reduced Instruction Set Computer) architecture may include five pipeline stages, whereas computers that are more modern may include eight, fourteen, or even more than 20 pipeline stages; although some computer architectures include as little as three stages. It is understood that the above are merely a few illustrative examples to which the disclosed subject matter is not limited.

In the illustrated embodiment, the fetch unit 102 may fetch the first store operation 190. In one such embodiment, the system 100 may include a load/store resynchronization predictor (LSRP) 104. The workings of the load/store resynchronization predictor 104 will be described in detail further below, and for purposes of this point in the example the load/store resynchronization predictor 104 may indicate that no special measures should be taken in regards to the first store operation 190. In such an embodiment, the first store operation 190 may be treated as any store operation might be traditionally treated. It is understood that the above is merely one illustrative example to which the disclosed subject matter is not limited.

In various embodiments, the fetch unit 102 may include a program counter (PC) 112 configured to store (at least temporarily) the instruction address of the current instruction (e.g., first store operation 190, etc.). In various embodiments, this PC 112 may be employed to associate memory read operations (e.g., first store operation 190) with various pipeline hazards, such as for example, a Read-After-Write (RAW) Resynchronization Exception (RRE), as described below. Specifically, the PC 112 may provide the LSRP 104 with an identifier representing the instruction address of a memory store operation.

In such an embodiment, the first store operation 190 may progress to the next stage in the pipeline, via the instruction bus 150. In various embodiments, the system 100 may include a decode unit 106 configured to convert the bits included by the instruction (e.g., first store operation 190, etc.) into the control signals that control the other parts of the system (e.g., the execution unit 108, etc.).

During the clock cycle in which the first store operation 190 is being processed by the decode unit 106, the fetch unit 102 may fetch the first load operation 192. In the illustrated embodiment, the first load operation 192 may be "younger" than the first store operation 190 (which would be referred to as "older"). It is understood that in various embodiments, a number of cycles and instructions may pass between the fetching of the first store operation 190 and the first load operation 192, but the illustrative example has been simplified for clarity.

In various embodiments, the system 100 may include an execution unit 108 configured to execute memory operations (e.g., loads, stores, etc.). In various embodiments, the system 100 may include a plurality of execution units each configured to perform various functions (e.g., addition, floating-point math, etc.). In some embodiments, the execution unit 108 may include a load/store unit (LSU). It is understood that the above are merely a few illustrative examples to which the disclosed subject matter is not limited.

In various embodiments, both the first store operation 190 and the first load operation 192 may eventually be received by the execution unit 108 and may be temporarily stored there waiting processing. In various embodiments, the fetch unit 102 may continue to fetch instructions (not explicitly shown) from the instruction memory 130 and those instructions may flow through the pipeline (at least partially) while the first store operation 190 and the first load operation 192 are awaiting execution.

In various embodiments, the execution unit 108 may not be configured to execute the instructions (e.g., first store operation 190, first load operation 192, etc.) immediately upon their receipt. In some embodiments, the memory operations may target a specific memory address where the desired or target data is stored or to be stored. In such an embodiment, the proper memory address may need to be decoded or otherwise determined. This determination may take a variable amount of time. In various embodiments, this variation in the amount of memory address determination time may facilitate the out-of-order execution of instructions. For example, in the illustrated embodiment, the execution unit 108 may be configured to execute younger instructions (e.g., first load operation 192, etc.) ahead or prior to older instructions (e.g., first store operation 190, etc.), if the younger instructions target memory address is determined first. It is understood that the above is merely one illustrative example to which the disclosed subject matter is not limited.

In the illustrated embodiment, the execution unit 108 may include a Load-Store Scheduler 118 configured to include all memory operations that are awaiting execution. In various embodiments, the Load-Store scheduler 118 may be configured to select the oldest memory operation that can be executed (e.g., for which a memory address is known, etc.) As described above, because calculating memory addresses for different memory operations may take a variable amount of time, younger memory operations may be ready to be executed before older memory operations and therefore memory operations may be executed out of program order or the order in which they were fetched by the fetch unit 102.

In the illustrated embodiment, both the first store operation 190 and first load operation 192 may target the same memory address (or portion of the same memory address, etc.). In such an embodiment, it may happen that the first load operation 192 may be executed first.

In various embodiments, the execution unit 108 may include an Out-of-Order Load Queue (OOLQ) 116 configured to store all loads (or representations thereof) that were executed ahead of an older store. In such an embodiment, when the first load operation 192 is selected by the load-store scheduler 118, the first load operation 192 (or a representation thereof) may be placed within the OOLQ 116. In various embodiments, the execution unit 108 may be configured to remove a load from the OOLQ 116 when that load is the oldest memory operation in the pipeline.

In the illustrated embodiment, the system 100 may include a data memory 132. In various embodiments, when the first load operation 192 is executed, the memory operation request 158 may be made to the data memory 132. Further, in various embodiments, the data memory 132 may include one or more levels or tiers of a cache system. In the illustrated embodiment, the cache system may include a level 1 data (L1-D) cache 133 and a main memory 134.

In the illustrated embodiment, the data requested at the memory address may be included in the L1-D cache 133 and may be returned via a memory operation response 160. In another embodiment, the data may not be included in the data memory 132 and may need to be retrieved from the main memory 134 via the bus 162, as described below in reference to FIG. 2. However, in this illustrative embodiment, the first load operation 192 may execute without incident. It is understood that the above is merely one illustrative example to which the disclosed subject matter is not limited.

In the illustrated embodiment, at a later time, the first store operation 190 may be selected for execution. In various embodiments, when a memory store operation is selected for execution, the execution unit 108 may be configured to check that the store is not older than a previously executed load that targets the same memory address. In some embodiments, this checking may occur via the OOLQ 116. In such an embodiment, the OOLQ 116 may include the target memory address of the aforementioned memory load operations.

In the illustrated embodiment, the first store operation 190 and the first load operation 192 may both share or include the same target memory address. In such an embodiment, the execution of the older first store operation 190 after the younger first load operation 192 may mean that the first load operation 192 retrieved invalid data. In such an embodiment, the first store operation 190 may be identified as causing a RAW Resynchronization Exception (RRE), as described above.

In the illustrated embodiment, the execution unit 108 may be configured to send a RRE message 170 to the fetch unit 102. In such an embodiment, the RRE message 170 may cause the fetch unit 102 to rewind the operation of the system 100 to the point when the first store operation 190 was fetched from the instruction memory 130, as described above.

In various embodiments, the system 100 may include the load/store resynchronization predictor 104 briefly mentioned above. In various embodiments, the load/store resynchronization predictor 104 may be configured to predict if a memory store operation is likely to cause a RRE if it is executed after a younger memory load operation (to the same target memory address). In addition, in the illustrated embodiment, execution unit 108 may be configured to send a RPS training message 172 to the load/store resynchronization predictor (LSRP) 104. In such an embodiment, this RPS training message 172 may train the LSRP 104 and aid in the LSRP 104's predictive capabilities.

In various embodiments, the LSRP 104 may be configured to associate instruction addresses with the likelihood or desirability of a RRE. In the illustrated embodiment, the LSRP 104 may include a Resynchronization Predicted Store (RPS) List 114. In such an embodiment, the RPS list 114 may be configured to associate instruction addresses of memory store operations with prior occurrences of RREs.

As described below, in various embodiments, the RPS list 114 may associate each instruction address entry with one of four states or values. In one embodiment, a first state may be an "Avoid RRE" state that indicates that this instruction address has been encountered before and when executed resulted in an RRE. This state may cause the Execution Unit to attempt to avoid an RRE, as described below.

A second state may include "Allow RRE" that indicates that this instruction address has been encountered before and when executed resulted in an RRE. This state may indicate that despite an RRE occurring in the past, that for some reason the occurrence of an RRE is more desirable that not having an RRE occur or a cost associated with preventing the RRE. In such an embodiment, the execution unit 108 may not take special pains to avoid an RRE and may treat the older store and younger load pair similarly to that described above in relation to the first store operation 190 and first load operation 192. This state will be described in more detail below in reference to FIG. 2.

A third value may be "Unknown" and this may signify that the LSRP 104 does not know or have any data as to whether or not a memory store operation has previously caused a RRE. In some embodiments, this state may not actually be stored in the RPS list 114, but may be the default state if no entry is found for a given instruction address. In the illustrated embodiment, this may be the state reported by the LSRP 104 when the first store operation 190 was fetched.

In one embodiment, a fourth state may include a "No RRE expected" state configured to indicate that an instruction address has been encountered before and it did not cause a RRE. In such an embodiment, the execution unit 108 may be configured to send an RPS training message 172 to the LSRP 104 even if the memory store operation does not result in an RRE. In the illustrated embodiment, the LSRP 104 may not make use of this fourth state, and the LSRP 104 may only employ three states. In such an embodiment, the execution unit 108 may be configured to send an RPS training message 172 only when an RRE occurs. In such an embodiment, the LSRP 104 may be uninformed when a memory store operation executes without incident. It is understood that the above are merely a few illustrative examples to which the disclosed subject matter is not limited.

In the illustrated embodiment, the fetch unit 102 may fetch the second store operation 194. In various embodiments, the fetch unit 102 may query the LSRP 104 asking to predict whether the second store operation 194 will cause an RRE. In various embodiments, the fetch unit 102 may provide the LSRP 104 with the instruction address 152 of the second store operation 194.

In the illustrated embodiment, the first store operation 190 and the second store operation 194 may be stored at the same instruction address. In such an embodiment, the first store operation 190 may be the same instruction as the second store operation 194, merely fetched at different times. It is understood that the above is merely one illustrative example to which the disclosed subject matter is not limited.

In such an embodiment, the LSRP 104 may compare the instruction address of the second store operation 194 with the instruction addresses stored in the RPS list 114. As the first store operation 190 caused an RRE, the instruction address (shared by the two store operations 190 and 194) may be included in the RPS list 114 and associated with an RRE. In various embodiments, the second store operation 194 may be referred to as a "Resynchronization Predicted Store (RPS)" as the LSRP 104 predicts that it will cause a RRE. In some embodiments, a RPS may both be associated with a prior RRE and the LSRP 104 may desire that the RRE not occur. For example, the RPS may have a state of "Avoid RRE" and not "Allow RRE", "Unknown", or "No RRE expected". It is understood that the above are merely a few illustrative examples to which the disclosed subject matter is not limited.

In the illustrated embodiment, the LSRP 104 may provide the associated state or prediction to the fetch unit 102 via the prediction message 154. In various embodiments, the prediction message 154 may be transmitted besides or along with the instruction bus 150. In the illustrated embodiment, this may be done by adding one or more signals or prediction bits 156. In some embodiments, the prediction message 154 may be transmitted via the prediction bits 156. In another embodiment, the prediction message 154 may include the full state information (e.g., 2-bit state encoding for 4 possible states, more bits for a larger number of possible states, etc.) or other information (e.g., a percentage of times the instruction address caused a RRE, etc.), and the prediction bits 156 may include a simplified or distilled amount of information (e.g., an allow/prevent bit flag, etc.). In yet another embodiment, some information from the instruction address or a lookup index may be transmitted via the prediction bits 156 and may be used to associate RRE events with a particular instruction addresses in Fetch unit 102. It is understood that the above is merely one illustrative example to which the disclosed subject matter is not limited.

In such an embodiment, by transmitting an encoded value or bits 156 instead of a full or partial instruction address the number of bits transmitted between the pipeline stages (e.g., from fetch unit 102 to decode unit 106 to execution unit 108, etc.) may be reduced. It is understood that the above is merely one illustrative example to which the disclosed subject matter is not limited.

Figure 2:
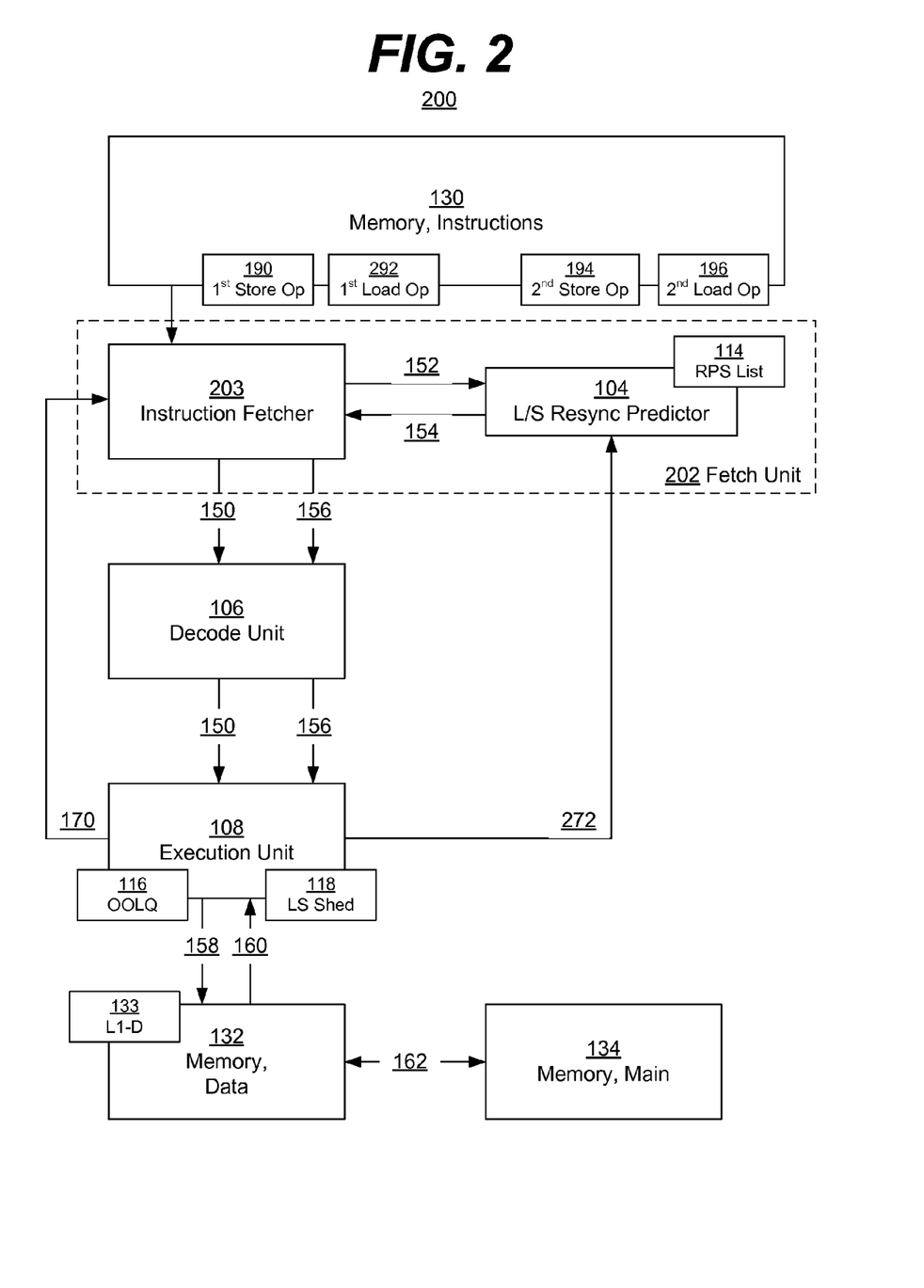
FIG. 2 is a block diagram of an example embodiment of a system in accordance with the disclosed subject matter.
Figure 3:
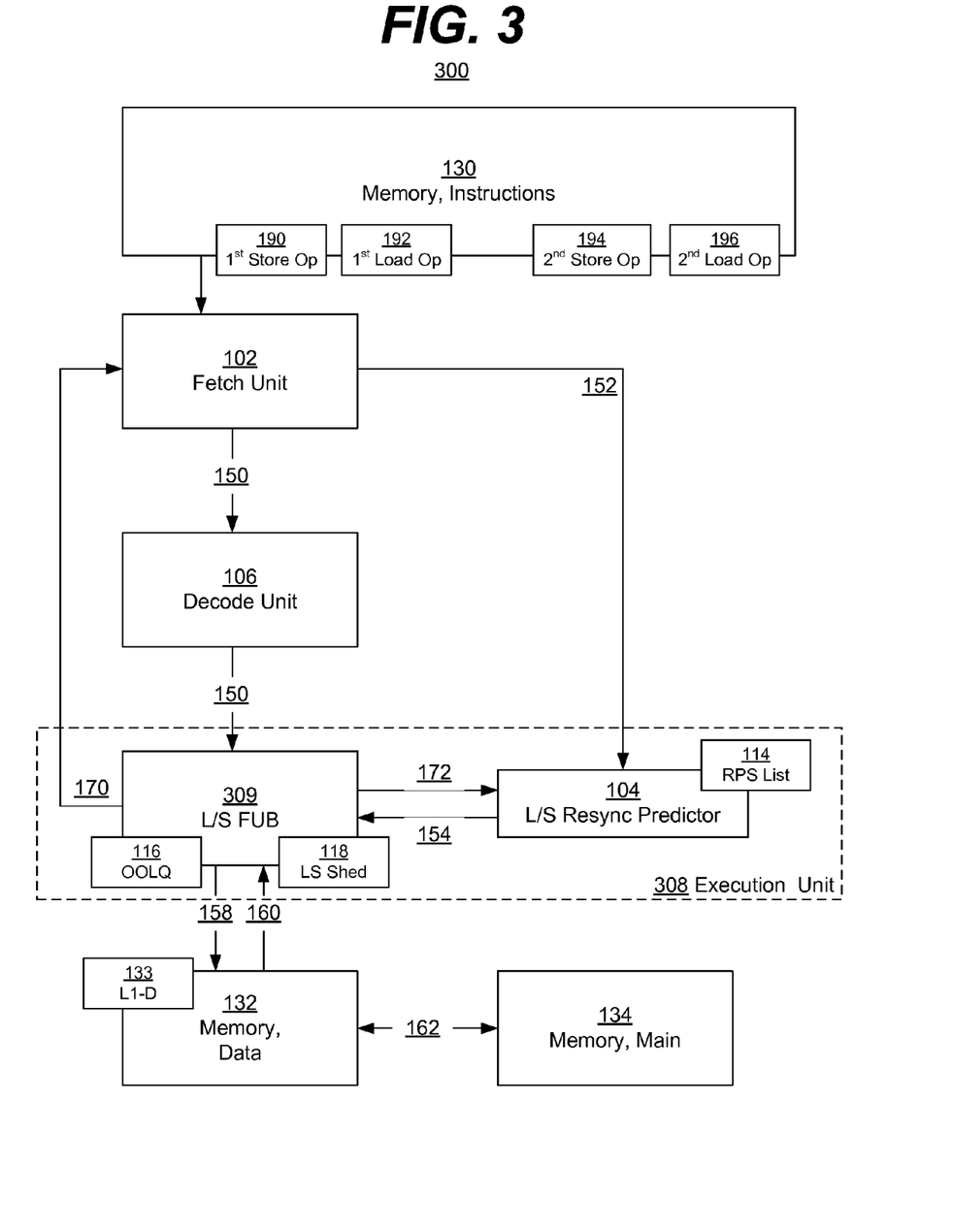
FIG. 3 is a block diagram of an example embodiment of a system in accordance with the disclosed subject matter.

As described in more detail in regards to FIG. 3, in various embodiments, a full or partial instruction address may be transmitted from the fetch unit 102 to the execution unit 108. However, in some embodiments (e.g., those shown in FIGS. 1 & 2), it may be beneficial to have the LSRP 104 reside relatively close to the fetch unit 102, such that the instruction address need not be transmitted down the pipeline, and instead over a relatively short distance. In various embodiments, the cost (e.g., area, logic, power, etc.) of transmitting a large number of signals (e.g., a 32, 64, or 128 bit address, etc.) across pipeline stages may be relatively high. In such an embodiment, by transmitting only the prediction bits 156 between pipeline stages (e.g., between the fetch unit 102, decode unit 106, and then the execution unit 108, etc.) may be less expensive than transmitting a full instruction address (as shown in FIG. 3, for example). It is understood that the above is merely one illustrative example to which the disclosed subject matter is not limited.

Again, a second load operation 196 may be fetched. The second store operation 194 and the second load operation 196 may target the same memory address. In such an embodiment, the second load operation 196 may be the "younger" instruction and the second store operation 194 may be the "older" instruction. As described above, the two instructions may be stored in the execution unit 108 and await execution.

However, while in the first case the execution unit 108 was free to perform the first store operation 190 or the first load operation 192 in any order, as the opportunity presented itself, in the second case the execution unit 108 may be more constrained. As described above, the second store operation 194 was identified by the LSRP 104 as being an RPS. In such an embodiment, the execution unit 108 may be configured to not allow the second load operation 196 (the younger instruction) to execute before the second store operation 194 (the older instruction) has completed its execution. In such an embodiment, an RRE may not be possible as the second load operation 196 reads the data after the older second store operation has written the most up to date data. In various embodiments, this rigid ordering may be accomplished by the load-store scheduler 118.

In some embodiments, the execution unit 108 may be configured to block or delay any younger loads until the RPS has completed, regardless of the loads' target memory address. In various embodiments, this may be less than desirable as a number of these younger loads may be to different memory addresses and therefore their out-of-order execution may not be capable of causing a RRE (as an RRE is caused by out-of-order memory operations to the same memory address). In various embodiments, these loads to different memory addresses may be referred to as "Noncritical loads (NCLs)" and the performance cost of delaying the NCLs may be referred to as a "NCL penalty". In such an embodiment, the performance gain of avoiding the RRE penalty may be greater than the performance loss of the blocked NCL's, making the delay due to the RPS worthwhile.

However, in another embodiment, the execution unit 108 may be configured to screen or filter the younger loads that are to be delayed due to the RPS. If so, the load may be delayed until the RPS has completed. If not and another non-conflicting memory address is targeted by the load, the load may be allowed to execute out-of-order. It is understood that the above are merely a few illustrative examples to which the disclosed subject matter is not limited.

FIG. 2 is a block diagram of an example embodiment of a system 200 in accordance with the disclosed subject matter. In the illustrated embodiment, a system for reducing the cost incurred due to a RRE is shown. Specifically, an embodiment is illustrated in which four instructions are specifically shown. In the illustrated embodiment, the first pair of instructions may cause a RRE and the system 100 may be employed to allow a second RRE due to the second pair of instructions. Other scenarios are shown in regards to FIGS. 1 and 3. It is understood that the above are merely a few illustrative examples to which the disclosed subject matter is not limited.

In the illustrated embodiment, the system 200 may include the instruction memory 130, the fetch unit 202, the decode unit 106, the execution unit 108, the data memory 132, and/or the main memory 134. These components may perform similarly to those described in FIG. 1.

However, in the illustrated embodiment, the fetch unit 202 may include or be integrated with the LSRP 104. Furthermore, in various embodiments, the fetch unit 202 may include an instruction fetcher 203 configured to retrieve, fetch, or issue instructions from the instruction memory 130.

In the illustrated embodiment, the fetch unit 202 may fetch the first store operation 190 and the first load operation 292. In such an embodiment, the first store operation 190 and the first load operation 292 may both target the same memory address. These instructions may again be stored in the execution unit 108 and await execution. In one embodiment, the first load operation 292 (the younger instruction) may execute first.

In the illustrated embodiment, the data requested by the first load operation 292 may not be stored within the data memory 132 (or at least the L1-D cache 133). In such an embodiment, the data memory 132 may generate a cache-miss indication (CMI) as the response 160, and may issue a cache fill request to the main memory 134 (or next tier in the cache system). In such an embodiment, a non-trivial delay may occur as the requested data is retrieved from the main memory 134. This delay may cause the pipeline to stall (e.g., instructions may remain in the same pipeline stage until the data is retrieved, etc.) or cause other performance penalties.

In various embodiments, if the requested data is not stored in the data memory 132, the OOLQ 116 may be configured to save a cache-miss indication (CMI) with the entry for the first load operation 292. When the first store operation 190 is executed, the OOLQ 116 may be consulted. In various embodiments, the OOLQ 116 may indicate that a younger load operation (e.g., the first load operation 292, etc.) was executed prior to the older first store operation 190. In various embodiments, this may result in an RRE and the RRE message 170, as described above.

In various embodiments, the execution unit 108 may issue an RPS training message 272 to the LSRP 104 indicating that the first store operation 190 caused a RRE. However, in the illustrated embodiment, the RPS training message 272 may also include an indication that the load operation associated with the RRE (e.g., the first load operation 292, etc.) caused a cache-miss. In such an embodiment, this RPS training message 272 may be configured to "anti-train" the LSRP 104. In such an embodiment, the RPS training message 272 may associate the instruction address of the first store operation 190 with the "Allow RRE" state. In such an embodiment, the LSRP 104 may determine that the penalty incurred due to the delay of the cache miss may be greater or less desirable than the penalty incurred by the RRE.

For example, the penalty incurred by the cache-miss may be undesirable, but it may cause the targeted memory address to be stored in the L1-D cache 133. If the first store operation 190 had been executed first or in-order, the first store operation 190 would have caused a cache miss and incurred that penalty. Therefore, the cache miss penalty may be unavoidable (or at least likely) and by performing the younger load operation as soon as possible, the cache miss penalty may be resolved as soon as possible. Ideally, the target data may be retrieved and stored within the data memory 132 by the time the older store operation attempts to access it. In such an embodiment, the cache miss and RRE penalties may be timed to reduce their overall impact. This is contrasted with various embodiments in which, if the cache miss and RRE penalties occurred back-to-back, their impact may be maximized. It is understood that the above is merely one illustrative example to which the disclosed subject matter is not limited.

In various embodiments, the RPS training message 272 may include both the occurrence of the RRE and the CMI. In another embodiment, the RPS training message 272 may simply indicate that the first store operation 190 should not be considered a RPS. In yet another embodiment, the RPS training message 272 may be included with or as part of the RRE message 170. In yet one more embodiment, the RPS training message 272 may not be transmitted and therefore, the LSRP 104 may not cause the instruction address of the first store operation 190 to be associated with an RRE. It is understood that the above are merely a few illustrative examples to which the disclosed subject matter is not limited.

In the illustrated embodiment, the fetch unit 202 may fetch the second store operation 194. In various embodiments, the LSRP 104 may indicate whether the second store operation 194 includes a RPS. In various embodiments, the LSRP 104 may base this prediction, at least in part, upon the instruction address of the second store operation 194.

In such an embodiment, the LSRP 104 may compare the instruction address of the second store operation 194 with the instruction addresses stored in the RPS list 114. As the first store operation 190 caused a RRE, the instruction address (shared by the two store operations 190 and 194) may be associated with an RRE, but may also be associated with the CMI or another mitigating indicator. In such an embodiment, the instruction address may be in an "Allow RRE" or more generally, an anti-trained state, and therefore the second store operation 194 may not be not considered an RPS.

Again, a second load operation 196 may be fetched. The second store operation 194 and the second load operation 196 may target the same memory address. In such an embodiment, the second load operation 196 may be the "younger" instruction and the second store operation 194 may be the "older" instruction. As described above, the two instructions may be stored in the execution unit 108 and await execution.

In the embodiment illustrated by FIG. 1, the execution unit 108 may have been constrained when executing the second store operation 194 and the second load operation 196. In the embodiment illustrated by FIG. 2, the second store operation 194 was identified by the LSRP 104 as not being an RPS. In such an embodiment, the execution unit 108 may be configured to allow (as the opportunity arises) the second load operation 196 (the younger instruction) to execute before the second store operation 194 (the older instruction). In such an embodiment, an RRE may be possible.

In such an embodiment, if the targeted memory address has been evicted from the data memory 132 or L1-D cache 133, the second load operation 196 may cause a cache miss, as described above. In such an embodiment, the cache miss penalty and RRE penalty may occur in such a way that their overall performance cost is reduced. Likewise, an NCL penalty may not occur, as the execution unit 108 is free to pick younger loads to execution prior to the second store operation 194. It is understood that the above is merely one illustrative example to which the disclosed subject matter is not limited.

In various embodiments, the execution unit 108 or LSRP 104 may associate a memory store operation (or its instruction address) with either the "Avoid RRE" or the "Allow RRE" states based upon a predefined set of rules that balance the possible delays to determine a desired set of predicted outcomes. In another embodiment, the LSRP 104 may employ a heuristic weighting scheme to set the desired states based upon a plurality of prior memory operations. It is understood that the above are merely a few illustrative examples to which the disclosed subject matter is not limited.

FIG. 3 is a block diagram of an example embodiment of a system 300 in accordance with the disclosed subject matter. In the illustrated embodiment, a system for reducing the occurrence or cost incurred due to an RRE is shown. In various embodiments, the system 300 may perform operations similar to those of FIGS. 1 and/or 2. It is understood that the above are merely a few illustrative examples to which the disclosed subject matter is not limited.

In the illustrated embodiment, the system 300 may include the instruction memory 130, the fetch unit 102, the decode unit 106, the execution unit 308, the data memory 132, and/or the main memory 134. These components may perform similarly to those described in FIGS. 1 and/or 2.

However, in the illustrated embodiment, the execution unit 308 may include or be integrated with the LSRP 104. Furthermore, in various embodiments, the execution unit 308 may include load-store function unit block (FUB) 309 configured to execute memory operations (e.g., loads, stores, etc.).

Further, in the illustrated embodiment, the instruction address 152 (in whole or part) may be transmitted to the execution unit 308 from the fetch unit 102. In some embodiments, the instruction address 152 may be transmitted with the instruction bus 150. In the illustrated embodiment, instruction address 152 may be transmitted separately. It is understood that the above are merely a few illustrative examples to which the disclosed subject matter is not limited.

Figure 4:
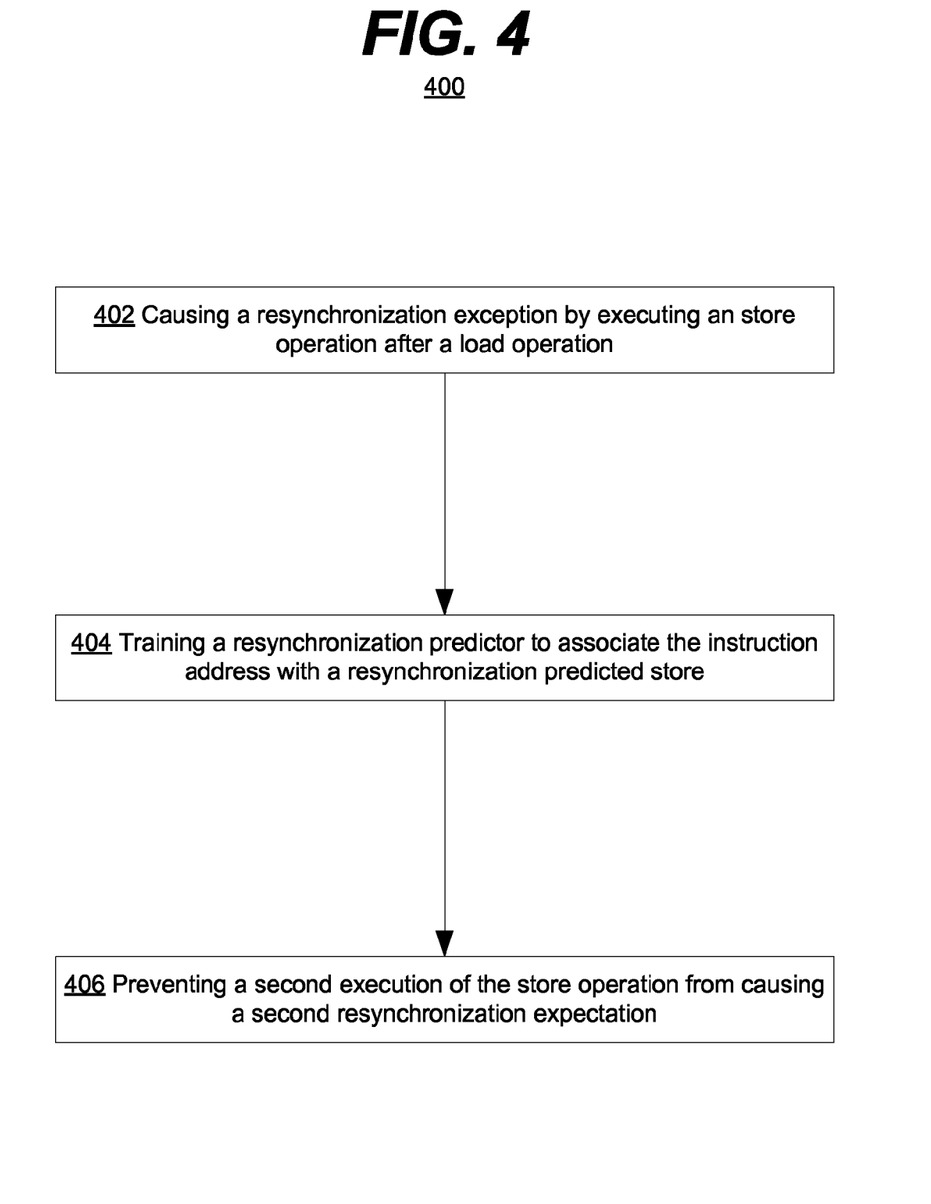
FIG. 4 is a flowchart of an example embodiment of a technique in accordance with the disclosed subject matter.

FIG. 4 is a flow chart of an example embodiment of a technique in accordance with the disclosed subject matter. In various embodiments, the technique 400 may be used or produced by the systems such as those of FIG. 1, 2, or 3. Although, it is understood that the above are merely a few illustrative examples to which the disclosed subject matter is not limited. It is understood that the disclosed subject matter is not limited to the ordering of or number of actions illustrated by technique 400.

Block 402 illustrates that, in one embodiment, a resynchronization exception may be caused by executing a store operation after a load operation, as described above. In various embodiments, the store operation may be associated with an instruction address, as described above. In various embodiments, one or more of the action(s) illustrated by this Block may be performed by the apparatuses or systems of FIG. 1, 2, 3, or 5, the execution units of FIG. 1, 2, or 3, as described above.

Block 404 illustrates that, in one embodiment, a resynchronization predictor may be trained to associate the instruction address with a resynchronization predicted store, as described above. In various embodiments, one or more of the action(s) illustrated by this Block may be performed by the apparatuses or systems of FIG. 1, 2, 3, or 5, the load/store resynchronization predictors of FIG. 1, 2, or 3, as described above.

Block 406 illustrates that, in one embodiment, a second execution of the store operation may be prevented from causing a second resynchronization expectation, as described above. In various embodiments, preventing may be based, at least partially upon the resynchronization predictor, as described above. In one embodiment, preventing a second execution of the store operation from causing a second resynchronization expectation may include delaying an execution of a second load operation until the second execution of the store operation is completed, wherein the second load operation is younger than the store operation, as described above.

In another embodiment, preventing the second execution of the store operation from causing a second resynchronization expectation may include preventing the second execution of the store operation from causing a second resynchronization expectation, if an execution of the load operation did not cause a cache miss, as described above. In such an embodiment, preventing may also include allowing the second execution of the store operation to causing a second resynchronization expectation, if an execution of the load operation did cause a cache miss, as described above.

In yet another embodiment, preventing a second execution of the store operation from causing a second resynchronization expectation may include fetching the store operation from a memory, as described above. In such an embodiment, preventing may include submitting the instruction address of the store operation to the resynchronization predictor, as described above. In one such embodiment, preventing may include receiving a resynchronization prediction from the resynchronization predictor that predicts whether an undesired resynchronization exception is likely if the store operation is executed a second time, as described above. In various embodiments, one or more of the action(s) illustrated by this Block may be performed by the apparatuses or systems of FIG. 1, 2, 3, or 5, the load/store resynchronization predictors of FIG. 1, 2, or 3, the fetch units of FIG. 1, 2, or 3, and/or the execution units of FIG. 1, 2, or 3, as described above.

Figure 5:
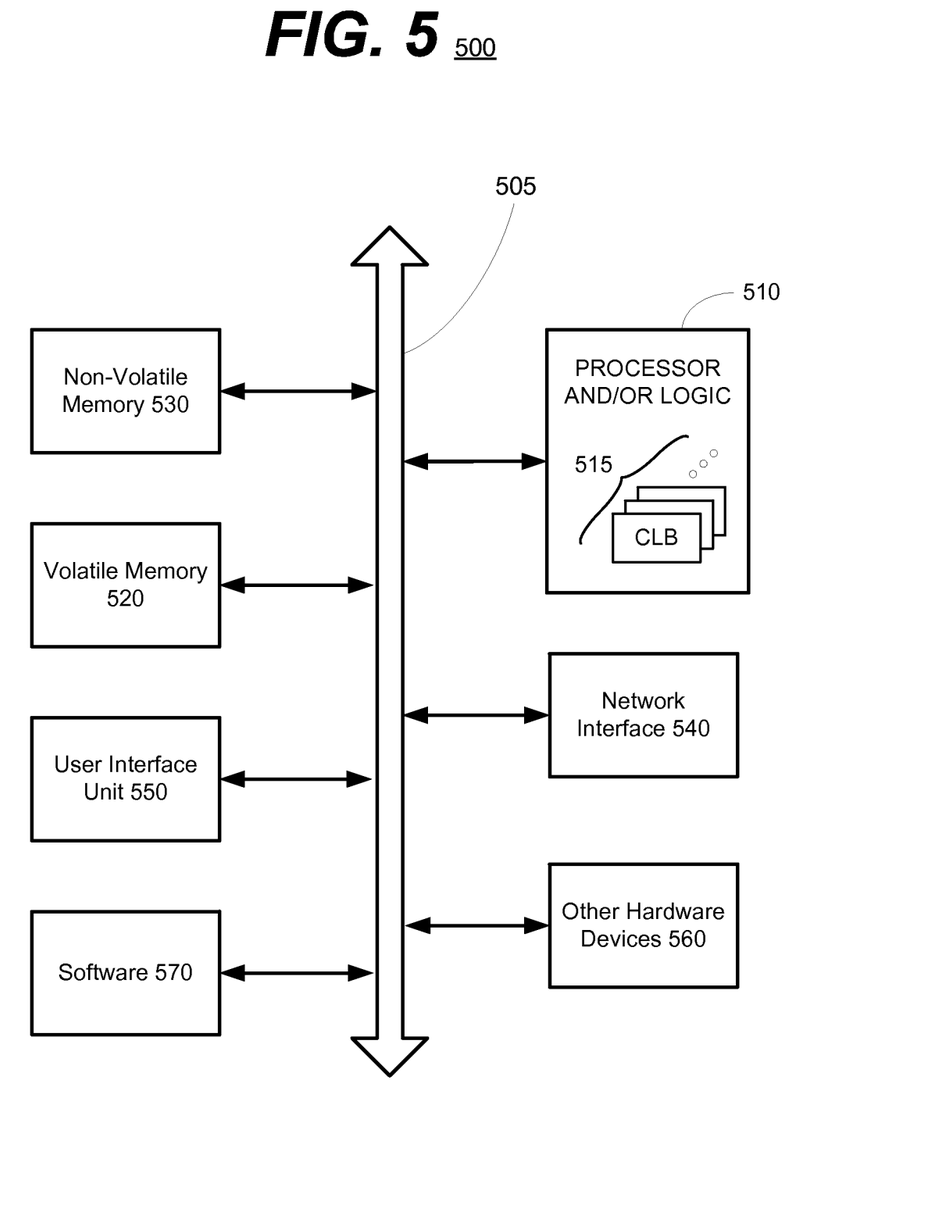
FIG. 5 is a schematic block diagram of an information processing system that may include devices formed according to principles of the disclosed subject matter.

FIG. 5 is a schematic block diagram of an information processing system 500, which may include semiconductor devices formed according to principles of the disclosed subject matter.

Referring to FIG. 5, an information processing system 500 may include one or more of devices constructed according to the principles of the disclosed subject matter. In another embodiment, the information processing system 500 may employ or execute one or more techniques according to the principles of the disclosed subject matter.

In various embodiments, the information processing system 500 may include a computing device, such as, for example, a laptop, desktop, workstation, server, blade server, personal digital assistant, smartphone, tablet, and other appropriate computers, etc. or a virtual machine or virtual computing device thereof. In various embodiments, the information processing system 500 may be used by a user (not shown).

The information processing system 500 according to the disclosed subject matter may further include a central processing unit (CPU), logic, or processor 510. In some embodiments, the processor 510 may include one or more functional unit blocks (FUBs) or combinational logic blocks (CLBs) 515. In such an embodiment, a combinational logic block may include various Boolean logic operations (e.g., NAND, NOR, NOT, XOR, etc.), stabilizing logic devices (e.g., flip-flops, latches, etc.), other logic devices, or a combination thereof. These combinational logic operations may be configured in simple or complex fashion to process input signals to achieve a desired result. It is understood that while a few illustrative examples of synchronous combinational logic operations are described, the disclosed subject matter is not so limited and may include asynchronous operations, or a mixture thereof. In one embodiment, the combinational logic operations may comprise a plurality of complementary metal oxide semiconductors (CMOS) transistors. In various embodiments, these CMOS transistors may be arranged into gates that perform the logical operations; although it is understood that other technologies may be used and are within the scope of the disclosed subject matter.

The information processing system 500 according to the disclosed subject matter may further include a volatile memory 520 (e.g., a Random Access Memory (RAM), etc.). The information processing system 500 according to the disclosed subject matter may further include a non-volatile memory 530 (e.g., a hard drive, an optical memory, a NAND or Flash memory, etc.). In some embodiments, either the volatile memory 520, the non-volatile memory 530, or a combination or portions thereof may be referred to as a "storage medium". In various embodiments, the volatile memory 520 and/or the non-volatile memory 530 may be configured to store data in a semi-permanent or substantially permanent form.

In various embodiments, the information processing system 500 may include one or more network interfaces 540 configured to allow the information processing system 500 to be part of and communicate via a communications network. Examples of a Wi-Fi protocol may include, but are not limited to, Institute of Electrical and Electronics Engineers (IEEE) 802.11g, IEEE 802.11n, etc. Examples of a cellular protocol may include, but are not limited to: IEEE 802.16m (a.k.a. Wireless-MAN (Metropolitan Area Network) Advanced), Long Term Evolution (LTE) Advanced), Enhanced Data rates for GSM (Global System for Mobile Communications) Evolution (EDGE), Evolved High-Speed Packet Access (HSPA+), etc. Examples of a wired protocol may include, but are not limited to, IEEE 802.3 (a.k.a. Ethernet), Fibre Channel, Power Line communication (e.g., HomePlug, IEEE 1901, etc.), etc. It is understood that the above are merely a few illustrative examples to which the disclosed subject matter is not limited.

The information processing system 500 according to the disclosed subject matter may further include a user interface unit 550 (e.g., a display adapter, a haptic interface, a human interface device, etc.). In various embodiments, this user interface unit 550 may be configured to either receive input from a user and/or provide output to a user. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

In various embodiments, the information processing system 500 may include one or more other devices or hardware components 560 (e.g., a display or monitor, a keyboard, a mouse, a camera, a fingerprint reader, a video processor, etc.). It is understood that the above are merely a few illustrative examples to which the disclosed subject matter is not limited.

The information processing system 500 according to the disclosed subject matter may further include one or more system buses 505. In such an embodiment, the system bus 505 may be configured to communicatively couple the processor 510, the volatile memory 520, the non-volatile memory 530, the network interface 540, the user interface unit 550, and one or more hardware components 560. Data processed by the processor 510 or data inputted from outside of the non-volatile memory 530 may be stored in either the non-volatile memory 530 or the volatile memory 520.

In various embodiments, the information processing system 500 may include or execute one or more software components 570. In some embodiments, the software components 570 may include an operating system (OS) and/or an application. In some embodiments, the OS may be configured to provide one or more services to an application and manage or act as an intermediary between the application and the various hardware components (e.g., the processor 510, a network interface 540, etc.) of the information processing system 500. In such an embodiment, the information processing system 500 may include one or more native applications, which may be installed locally (e.g., within the non-volatile memory 530, etc.) and configured to be executed directly by the processor 510 and directly interact with the OS. In such an embodiment, the native applications may include pre-compiled machine executable code. In some embodiments, the native applications may include a script interpreter (e.g., C shell (csh), AppleScript, AutoHotkey, etc.) or a virtual execution machine (VM) (e.g., the Java Virtual Machine, the Microsoft Common Language Runtime, etc.) that are configured to translate source or object code into executable code which is then executed by the processor 510.

The semiconductor devices described above may be encapsulated using various packaging techniques. For example, semiconductor devices constructed according to principles of the disclosed subject matter may be encapsulated using any one of a package on package (POP) technique, a ball grid arrays (BGAs) technique, a chip scale packages (CSPs) technique, a plastic leaded chip carrier (PLCC) technique, a plastic dual in-line package (PDIP) technique, a die in waffle pack technique, a die in wafer form technique, a chip on board (COB) technique, a ceramic dual in-line package (CERDIP) technique, a plastic metric quad flat package (PMQFP) technique, a plastic quad flat package (PQFP) technique, a small outline package (SOIC) technique, a shrink small outline package (SSOP) technique, a thin small outline package (TSOP) technique, a thin quad flat package (TQFP) technique, a system in package (SIP) technique, a multi-chip package (MCP) technique, a wafer-level fabricated package (WFP) technique, a wafer-level processed stack package (WSP) technique, or other technique as will be known to those skilled in the art.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

In various embodiments, a computer readable medium may include instructions that, when executed, cause a device to perform at least a portion of the method steps. In some embodiments, the computer readable medium may be included in a magnetic medium, optical medium, other medium, or a combination thereof (e.g., CD-ROM, hard drive, a read-only memory, a flash drive, etc.). In such an embodiment, the computer readable medium may be a tangibly and non-transitorily embodied article of manufacture.

While the principles of the disclosed subject matter have been described with reference to example embodiments, it will be apparent to those skilled in the art that various changes and modifications may be made thereto without departing from the spirit and scope of these disclosed concepts. Therefore, it should be understood that the above embodiments are not limiting, but are illustrative only. Thus, the scope of the disclosed concepts are to be determined by the broadest permissible interpretation of the following claims and their equivalents, and should not be restricted or limited by the foregoing description. It is, therefore, to be understood that the appended claims are intended to cover all such modifications and changes as fall within the scope of the embodiments.

What is claimed is:

1. An apparatus comprising:
  an instruction fetch unit configured to issue a first memory read operation to a memory address, and a first memory write operation to the memory address, wherein the first memory read operation is stored at an instruction address;
  an execution unit configured to:
    execute the first memory read operation, wherein the execution of the first memory read operation causes a resynchronization exception; and
  a cache resynchronization predictor configured to:
    associate the instruction address with a resynchronization exception, and
    determine if a memory read operation stored at the instruction address comprises a resynchronization predicted store.

2. The apparatus of claim 1, wherein the execution unit is configured to:
  execute the first memory write operation before the first memory read operation,
  determine if the execution of the first memory write operation caused a cache-miss; and
  wherein the cache resynchronization predictor is configured to:
  if the execution of the first memory write operation caused a cache-miss, not associate the instruction address with a resynchronization exception even if a memory read operation stored at the instruction address caused a resynchronization exception.

3. The apparatus of claim 1, wherein the instruction fetch unit is configured to issue a second memory read operation to the memory address, and a second memory write operation to the memory address, wherein the second memory read operation is stored at the instruction address;
  wherein the cache resynchronization predictor is configured to determine if the second memory read operation comprises a resynchronization predicted store; and
  wherein the execution unit is configured to, if the second memory read operation comprises a resynchronization predicted store, execute the second memory write operation after the second memory read operation.

4. The apparatus of claim 1, wherein the execution unit is configured to:
  transmit a resynchronization feedback signal, to the cache resynchronization predictor, when the execution of the first memory read operation causes the resynchronization exception.

5. The apparatus of claim 1, wherein the cache resynchronization predictor is configured to determine if a delay caused by a predicted resynchronization exception caused by a memory read operation is greater than a predicted delay caused by a memory write operation;
  if so, determine that the memory read operation comprises a resynchronization predicted store; and
  if not, determine that the memory read operation does not comprise a resynchronization predicted store.

6. The apparatus of claim 1, wherein the cache resynchronization predictor is configured to associate one state with an instruction address selected from a group consisting of unknown, allow a resynchronization exception, avoid a resynchronization exception, and no resynchronization exception expected.

7. The apparatus of claim 1, wherein the execution unit is configured to execute a second memory read operation from the instruction address such that a resynchronization exception does not occur; and
wherein the cache resynchronization predictor is configured to, in response to the resynchronization exception, disassociate the instruction address with the resynchronization exception.

8. The apparatus of claim 1, wherein the instruction fetch unit is configured to provide the instruction address to the cache resynchronization predictor, but not the execution unit.

9. An apparatus comprising:
an instruction fetch unit configured to issue a memory read operation to a memory address, and a memory write operation to the memory address, wherein the memory read operation is stored at an instruction address;
a cache resynchronization predictor configured to determine if the memory read operation comprises a resynchronization predicted store, based at least upon whether a prior memory read operation from the instruction address caused a resynchronization exception; and
an execution unit configured to:
if the memory read operation comprises a resynchronization predicted store, execute the memory write operation after the memory read operation.

10. The apparatus claim 9, wherein the execution unit is configured to:
execute the prior memory read operation from the instruction address such that a resynchronization exception occurs; and
wherein the cache resynchronization predictor is configured to, in response to the resynchronization exception, associate the instruction address with a resynchronization exception.

11. The apparatus claim 9, wherein the execution unit is configured to:
execute the prior memory read operation from the instruction address, and
transmit a resynchronization feedback signal, to the cache resynchronization predictor, if the execution of the prior memory read operation causes a resynchronization exception.

12. The apparatus claim 9, wherein the cache resynchronization predictor is configured to determine that the memory read operation comprises a resynchronization predicted store if the memory read operation is associated with an instruction address that is associated with a resynchronization exception.

13. The apparatus claim 9, wherein the execution unit is configured to:
if the memory read operation does not comprise a resynchronization predicted store, execute the memory write operation before the memory read operation.

14. The apparatus claim 9, wherein the execution unit is configured to execute the prior memory read operation from the instruction address such that a resynchronization exception does not occur; and
wherein the cache resynchronization predictor is configured to, in response to the resynchronization exception, disassociate the instruction address with the resynchronization exception.

15. The apparatus claim 9, wherein the instruction fetch unit comprises the cache resynchronization predictor.

16. The apparatus claim 9, wherein the execution unit is configured to:
if the memory read operation comprises a resynchronization predicted store, prevent any memory write operations to the memory address issued after the memory read operation from executing prior to the memory read operation.

17. A method comprising:
causing a resynchronization exception by executing a store operation after a load operation, wherein the store operation is associated with an instruction address;
training a resynchronization predictor to associate the instruction address with a resynchronization predicted store; and
preventing, based, at least partially upon the resynchronization predictor, a second execution of the store operation from causing a second resynchronization expectation.

18. The method of claim 17 wherein preventing a second execution of the store operation from causing a second resynchronization expectation comprises:
delaying an execution of a second load operation until the second execution of the store operation is completed, wherein the second load operation is younger than the store operation.

19. The method of claim 17, wherein preventing the second execution of the store operation from causing a second resynchronization expectation comprises:
preventing the second execution of the store operation from causing a second resynchronization expectation, if an execution of the load operation did not cause a cache miss, and
allowing the second execution of the store operation to causing a second resynchronization expectation, if an execution of the load operation did cause a cache miss.

20. The method of claim 17, wherein preventing, based, at least partially, upon the resynchronization predictor, a second execution of the store operation from causing a second resynchronization expectation comprises:
fetching the store operation from a memory;
submitting the instruction address of the store operation to the resynchronization predictor; and
receiving a resynchronization prediction from the resynchronization predictor that predicts whether an undesired resynchronization exception is likely if the store operation is executed a second time.

* * * * *